United States Patent [19]
Cardin et al.

[11] Patent Number: 4,944,329
[45] Date of Patent: Jul. 31, 1990

[54] AUTOMATICALLY-OPERATED REDUNDANT-TYPE FLUID COUPLING DEVICE

[75] Inventors: Joseph M. Cardin, Buffalo, N.Y.; Raoul Fremy, Courcouronnes, France; Patrick K. Griffin, Cowlesville, N.Y.

[73] Assignee: Moog Inc., East Aurora, N.Y.; a part interest

[21] Appl. No.: 455,449
[22] PCT Filed: May 26, 1988
[86] PCT No.: PCT/US88/01778
§ 371 Date: Nov. 8, 1989
§ 102(e) Date: Nov. 8, 1989
[87] PCT Pub. No.: WO89/01587
PCT Pub. Date: Feb. 23, 1989

[51] Int. Cl.⁵ .................................... F16L 29/00
[52] U.S. Cl. ........................ 137/614.05; 137/614; 137/614.11
[58] Field of Search ............. 137/614, 614.01, 614.03, 137/614.04, 341, 613, 614.11, 614.05; 251/149.2, 149.8

[56] References Cited
U.S. PATENT DOCUMENTS
3,528,447 9/1970 Kulb ..................... 137/614.11 X Primary Examiner—John C. Fox
Attorney, Agent, or Firm—Sommer, Oliverio & Sommer

[57] ABSTRACT

A fluid coupling device has a male section (20) and a female section (21). Each of the sections has two rotatable ball-valve elements (30,31). A docking member (23,24) is mounted on each section to accommodate a misalignment of the flow passageways when the sections are brought together. When the sections are joined together, the ball valves automatically rotate sequentially from flow-preventing positions to flow-permitting positions.

17 Claims, 6 Drawing Sheets

AUTOMATICALLY-OPERATED REDUNDANT-TYPE FLUID COUPLING DEVICE

TECHNICAL FIELD

This invention relates generally to fluid coupling devices of the quick-disconnect type or otherwise, and, more particularly, to an improved coupling device having: (1) at least two rotary valve elements in at least one of the coupling sections which are operatively arranged to be sequentially rotated between flow-preventing and flow-permitting positions when the coupling sections are joined together, and/or (2) a docking mechanism pivotally mounted on at least one of the sections for accommodating a misalignment of the flow passageways when the two coupling sections are initially connected.

BACKGROUND ART

Fluid coupling devices are well known. In general, these devices commonly have male and female coupling sections which may be selectively joined together to establish a flow passageway therethrough. Often, the two sections are releasably held together by a quick-disconnect mechanism.

In many of the devices, each coupling section is provided with a valve element which is arranged to move automatically from a flow-preventing position to a flow-permitting position when the sections are joined together, and which is arranged to move automatically back to a flow-preventing position when the sections are physically separated. The valve element is often a poppet-type element, which is spring-biased to move toward a seat. However, in this type of device, even when the poppet is held open, the tortuous flow path around the poppet constitutes an obstruction to flow, and produces an accompanying pressure drop.

In another type of device, the valve element is rotatable between such flow-preventing and flow-permitting positions. While the actuating mechanism for selectively rotating the valve element is perhaps somewhat more complicated, those devices offer the advantage of a straight-through minimal restriction to flow and, hence, less of a pressure drop thereacross. Examples of such devices having rotatable ball-type valve elements are shown in U.S. Pat. Nos. 2,440,946 (Hansen), 3,078,068 (Romey), 3,159,180 (Courdot et al.) 3,423,063 (German), 3,618,892 (Sciuto), 4,181,149 (Cox), 4,438,779 (Allread), 4,445,664 (Allread), 4,473,211 (Fremy), 4,627,598 (Fremy), and 4,664,149 (Fremy).

In many of these types of devices, one coupling section is adapted to be moved axially toward the other during the connection sequence. Hence, if the respective axes of the two sections are initially misaligned, the operator must further manipulate the two sections in search of an axially-aligned position in addition to attempting to push them together. Moreover, in certain applications there is a need for increased fluid-tight integrity of the seal when the two coupling sections are separated.

DISCLOSURE OF THE INVENTION

Figure 14:
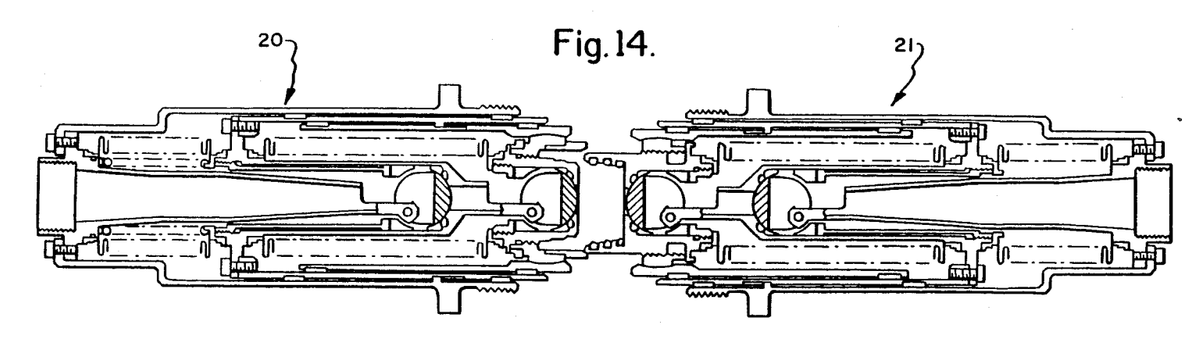
FIG. 14 is a schematic view showing the separated male and female coupling sections as being generally aligned, prior to connection, with all four valve elements being in their respective flow-preventing positions.
Figure 17:
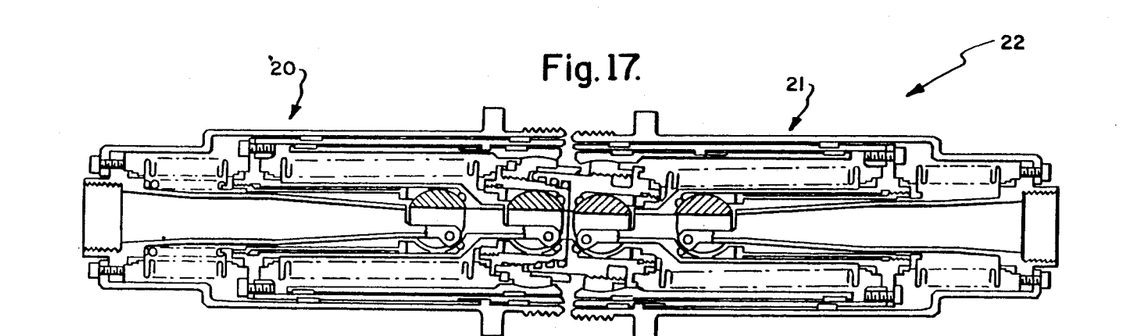
FIG. 17 is a view similar to FIG. 16, but shows the actuating and movable post members of each section as having been moved further relative to their associated bodies such that all four valve elements have rotated to their flow-permitting positions.

The present invention provides, in one aspect, an improvement in a fluid coupling section (e.g., 20 or 21) having a body (e.g., 25) provided with a flow passageway therethrough (e.g., within members 26,29), and having an actuating member (e.g., 34) mounted for movement relative to the body between two extreme positions. The improvement comprises: at least two valve elements (e.g., 30,31) operatively arranged in the flow passageway, each of the elements being mounted for selective rotation between a flow-preventing position (e.g., as shown in FIG. 14) and a flow-permitting position (e.g., as shown in FIG. 17), each of the elements being in its flow-preventing position when the actuating member is in one of the extreme positions (e.g., as shown in FIG. 14) and being in its alternative flow-permitting position when the actuating member is in the other of the extreme positions (e.g., as shown in FIG. 17); and an actuating mechanism (e.g., 26,28,29) for selectively rotating each of the valve elements from its flow-preventing position to its flow-permitting position when the actuating member is moved from the one extreme position to the other extreme position; whereby, when the actuating member is in the one extreme position, the valve elements will redundantly close the flow passageway.

In another aspect, the invention provides another improvement in a fluid coupling device having a first coupling section (e.g., 20) adapted to be releasably connected to a second coupling section (e.g., 21), and wherein each of the two sections has a body (e.g., 25) provided with a fluid flow passageway. The improvement broadly comprises: the first coupling section having a first surface (e.g., 174); the second coupling having a second surface (e.g., 259) arranged to be engaged by the first section first surface when the two sections are brought together; at least one of the surfaces being mounted for pivotal movement relative to its associated section such that, when the surfaces are caused to engage one another, such pivotal mounting of the one surface will accommodate an misalignment of the flow passageways in the two sections.

Accordingly, the general object of this invention is to provide an improved coupling device.

Another object is to provide an improved coupling section in which a pair of rotary valve elements are caused to rotate automatically to flow-permitting positions when the sections are joined together, and are caused to automatically rotate to flow-preventing positions when the coupling sections are physically separated.

Still another object is to provide an improved coupling section in which at least one of the coupling sections has a docking member mounted for omni-directional pivotal movement relative thereto, to accommodate an initial misalignment of the flow passageways through the respective coupling sections when the two sections are joined together.

These and other objects and advantages will become apparent from the foregoing and ongoing written specification, the drawings, and the appended claims.

MODE(S) OF CARRYING OUT THE INVENTION

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Structure

Figure 1:
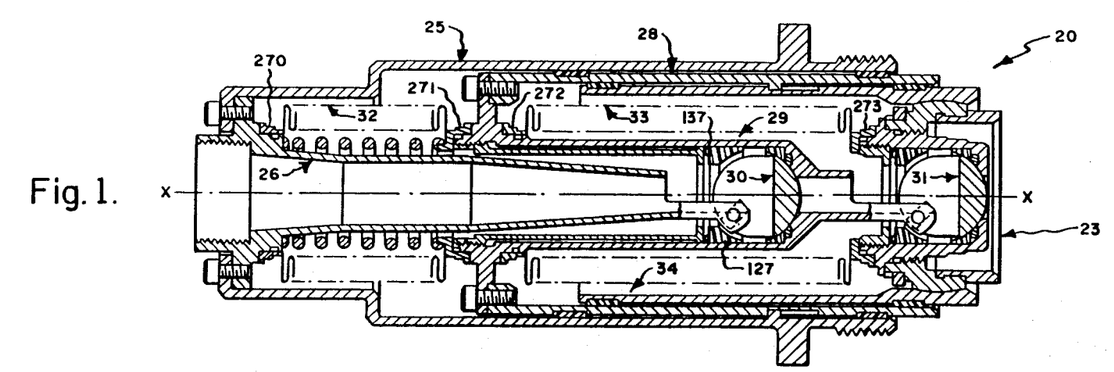
FIG. 1 is a longitudinal vertical sectional view of the separated male coupling section, showing its valve elements as being in their respective flow-preventing positions.
Figure 2:
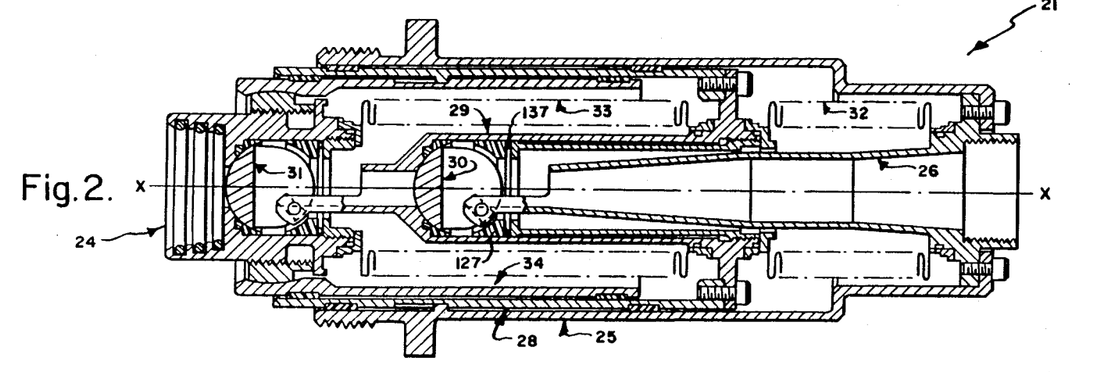
FIG. 2 is a longitudinal vertical sectional view of the separated female coupling section, showing its valve elements as also being in their respective flow-preventing positions.

Referring now to the drawings, this invention provides an improved coupling device, which includes a male section, generally indicated at 20 in FIG. 1, and a female section, generally indicated at 21 in FIG. 2. These two sections may be selectively coupled together according to the docking sequence shown in FIGS. 8–13 and the ball-rotation sequence shown in FIGS. 14–17, to form the assembled coupling device, which is generally indicated at 22 in FIG. 17, or may be selectively uncoupled by reversing these operational sequences.

As best shown in FIGS. 1 and 2, the male and female coupling sections have common parts, except for the configurations of the docking members. In this regard, the male section has its docking member 23 configured as a male member, while the female section has its docking member 24 configured as a female member. The two coupling sections are otherwise structurally identical, except that the various parts, portions or surfaces of the female section appear as a mirror image of the corresponding parts, portions or surfaces of the male section. Because of this, only the structure of the male section will be explicitly described, it being understood that the same number will indicate the corresponding part, portion or surface of the female section. However, since the male and female docking members 23, 24 differ structurally, they will be separately described.

It should also be noted that the details of the particular means or mechanism by which the two sections are releasably held together, have been deliberately omitted in the interest of clarity. Such mechanism may possibly be of the quick-disconnect type, such as shown and described in the aforesaid U.S. Pat. Nos. 4,627,598 and/or 4,664,149, the aggregate disclosures of which are hereby incorporated by reference, but it need not necessarily be so. Other mechanisms and devices, whether of the quick-disconnect type or otherwise, may be used to releasably hold the two coupling sections in a connected or assembled condition, as desired.

Adverting now to FIGS. 1 and 2, the male and female coupling sections are severally shown as broadly including a tubular body 25, a stationary post member 26 securely mounted on the body, an intermediate tubular member 28 slidably mounted within body 25, a movable post member 29 mounted on intermediate member 28 for axial movement therewith, a first out-board ball-type valve element 30 rotatably mounted on the distal end of the stationary post member and engaging the movable post member, and a second ball-type valve in-board element 31 rotatably mounted on the distal end of the movable post member and engaging the associated docking member. A first accordianlike bellows 32 surrounds the stationary post member and operatively engages the stationary and movable post members, and a second accordian-like bellows 33 surrounds the movable post member and operatively engages the movable post member and the associated docking member. A tubular actuating member 34 is slidably received within the intermediate member, and supports the associated docking member for omni-directional pivotal movement relative thereto. Each coupling section is shown as being horizontally elongated along axis x—x. Thus, the intermediate and acutating tubular members are telescopingly received within the outer body. Moreover, an actuating mechanism, described infra, is operatively arranged to automatically and sequentially rotate each of the ball valves from their flow-preventing positions, shown in FIGS. 1 and 2, to their alternative flow-permitting positions, shown in FIG. 17, when the coupling sections are brought together. Thus, the selectively-enabled flow passageway is through the two post members and the diametrical bores provided through the ball valves. Conversely, when the coupling sections are physically separated from one another, the ball valves will automatically and sequentially rotate back to their respective flow-preventing positions.

Figure 3:
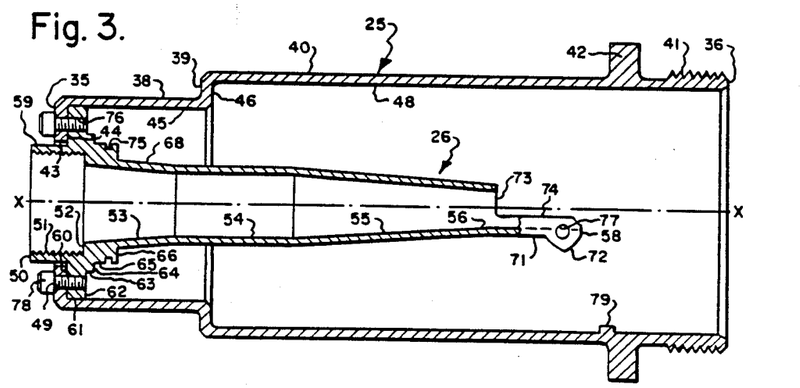
FIG. 3 is a longitudinal vertical sectional view of the male section body and stationary post member shown in FIG. 1.

Referring now to FIG. 3, post member 26 is shown as being mounted fast on male section body 25 to form a subsassembly therewith. Body 25 is a horizontally-elongated stepped tubular member having an annular vertical left end face 35 and an annular vertical right end face 36. The outer surface of body 25 sequentially includes (from left to right): an outwardly-facing horizontal cylindrical surface 38 extending rightwardly from left end face 35, a leftwardly-facing annular vertical surface 39, and an outwardly-facing horizontal cylindrical surface 40 continuing rightwardly therefrom and terminating in an externally-threaded portion 41 adjacent right end face 36. An integrally-formed annular mounting flange 42 extends radially outwardly from surface 40 adjacent threaded portion 41. Flange 42 and threaded portion 41 are provided to accommodate the mechanism (not shown) by which the two coupling sections are releasably held together. Alternatively, threaded portion 41 may accommodate a dust cap (not shown) to close the in-board ends of the separated coupling sections. The body inner surface sequentially includes (from left-to-right): an inwardly-facing horizontal cylindrical surface 43 extending rightwardly from left face 35, a rightwardly-facing annular vertical surface 44, an inwardly-facing horizontal cylindrical surface 45, a rightwardly-facing annular vertical suface 46, and an inwardly-facing horizontal cylindrical surface 48 continuing rightwardly therefrom to join right end face 36. The intersections of surfaces 45, 46, and 48,36 are shown as being beveled. Thus, the body is a horizontally-elongated thin-walled stepped tubular member having an in-turned left marginal end portion provided with a plurality of horizontal through-holes, severally indicated at 49, circularly spaced about body left opening 43.

Stationary post member 26 is shown as being a horizontally-elongated specially-configured open-ended tubular member arranged within the body. More particularly, post member 26 has an annular vertical left end face 50, and an inner surface which sequentially includes (from left-to-right): an internally-threaded portion 51 extending rightwardly from left end face 50, a leftwardly-facing annular vertical surface 52, an inwardly-and leftwardly-facing frusto-conical surface 53, an inwardly-facing horizontal cylindrical surface 54, an inwardly- and leftwardly-facing frusto-conical surface 55, and a sengmented inwardly facing horizontal cylindrical surface 56 continuing rightwardly therefrom to join a somewhat U-shaped vertical right end face 58. The outer surface of member 26 sequentially (from left-to-right): an outwardly-facing horizontal cylindrical surface 59 extending rightwardly from left end face 50, a leftwardly-facing annular vertical surface 60 shown as abutting body surface 44, an outwardly-facing horizontal cylindrical surface 61, a rightwardly-facing annular vertical surface 62, an outwardly-facing horizontal cylindrical surface 63, a rightwardly-facing annular vertical surface 64, an outwardly-facing annular vertical surface 64, an outwardly-facing horizontal cylindrical surface 65, a rightwardly-facing annular vertical surface 66, an outwardly- and rightwardly- facing frusto-conical surface 68 substantially parallel to surface 53, an outwardly-facing horizontal cylindrical surface 69 substantially paralled to inner surface 54, an outwardly-and rightwardly-facing frusto conical surface 70 substantially parallel to surface 55, and an outwardly-facing horizontal cylindrically-segmented surface 71 continuing rightwardly therefrom to join right end face 58. A bulbous portion 72 depends from surface 71 adjacent the right end face to accommodate a transverse horizontal hole 77 through the right marginal end of the post member. A portion of the post member has been removed, leaving a rightwardly-facing inverted U-shaped vertical surface 73, and a pair of transversely-spaced longitudinally-extending upwardly-facing coplanar horizontal surfaces, severally indicated at 74, extending from the lower margin of surface 73 to right end face 58. An annular groove or recess 75 extends radially into the post member from surface 65. A plurality of circularly-spaced tapped holes, severally indicated at 76, are provided through the post member between surfaces 60,62. These are adapted to be aligned with body holes 49. Hence, a plurality of fasteners, severally indicated at 78, may be arranged to have their head portions engage body outer surface 35, and have their threaded shank portions passed through body holes 49 and matingly received in post member tapped holes 76. Thus, these fasteners may be selectively tightened to securely mount the post member on the body. An integrally-formed axially-elongated rectangular lug 79 is shown as extending radially inwardly from body surface 48.

Figure 4:
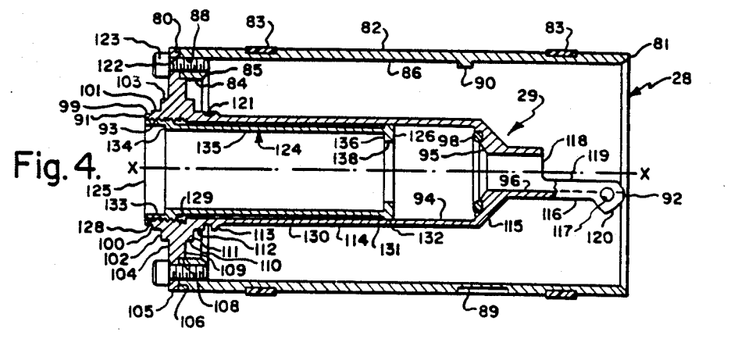
FIG. 4 is a longitudinal vertical sectional view of the male section movable intermediate and post members shown in FIG. 1.

Referring now to FIG. 4, movable post member 29 is shown as being mounted on intermediate slide member 28. This intermediate member is a horizontally-elongated open-ended tube having annular vertical left and right end faces 80,81, respectively, and having an outwardly-facing horizontal cylindrical surface 82 extending therebetween. A pair of axially-spaced annular grooves extend radially into the intermediate part from its outer surface 82 to receive and accommodate a pair of low-friction ring-like slide bearings, severally indicated at 83. The outer cylindrical surfaces of these bearings extend radially outwardly beyond surface 82 and are arranged to slidably engage body inner surface 48. The inner surface of the intermediate member is stepped, and sequentially includes (from left-to-right): an inwardly-facing horizontal cylindrical surface 84 extending rightwardly from left end face 80, a rightwardly-facing annular vertical surface 85, and an inwardly facing horizontal cylindrical surface 86 continuing rightwardly therefrom to join right end face 81. The intersections of surfaces 84,85 and 86,81 are shown as being beveled. The intermediate part is provided with a plurality of tapped horizontal holes, severally indicated at 88, which extend between surfaces 80,85. A longitudinally-elongated slot-like rectangular recess 89 extends into the intermediate part from outer surface 82 to receive andf accommodate body lug 79. This lug-and-recess connection forms a type of key-keyway connection which prevents rotation between, and limits permissable axial sliding movement of, the intermediate part relative to the body. Another integrally-formed axially-elongated rectangular lug 90 extends radially inwardly from intermediate part surface 86.

Post member 29 is shown as being a horizontally-elongated specially-configured open-ended tubular member, which is adapted to be mounted securely on intermediate part 28. More particularly, post member 29 has an annular vertical left end face 91, a somewhat U-shaped right end face 92, and a stepped inner surface which sequentially includes (from left-to-right): an internally-threaded portion 93 extending rightwardly from left end face 91, and inwardly-facing horizontal cylindrical surface 94, a leftwardly- and inwardly-facing frusto-conical surface 95, and an inwardly-facing horizontal cylindrical surface 96 continuing rightwardly therefrom to join right end face 92. A recess extends radially into the post member from surface 95 to receive and accommodate an O-ring 98. The post member outer surface sequentially includes (from left-to-right): an outwardly-facing horizontal cylindrical surface 99 extending rightwardly from left end face 91, a leftwardly-facing annular vertical surface 100, an outwardly-facing horizontal cylindrical surface 101, a leftwardly-facing annular vertical surface 102, an outwardly-facing horizontal cylindrical surface 103, a leftwardly-facing annular vertical surface 104, an outwardly-facing horizontal cylindrical surface 105, a rightwardly-facing annular vertical surface 106, an outwardly-facing horizontal cylindrical surface 108, a rightwardly-facing annular vertical surface 109, an outwardly-facing horizontal cylindrical surface 110, a rightwardly-facing annular vertical surface 111, an outwardly-facing horizontal cylindrical surface 112, a rightwardly and outwardly-facing annular concave arcuate surface 113, an outwardly-facing horizontal cylindrical surface 114, a rightwardly- and outwardly-facing frusto-conical surface 115, and an outwardly-facing horizontal cylindrical surface 116 continuing rightwardly therefrom to join right end face 92. A portion of the right marginal end portion of the post member has been removed so as to leave a rightwardly-facing inverted U-shaped vertical surface 118, and two transversely-spaced longitudinally-extending upwardly-facing coplanar horizontal surfaces, severally indicated at 119, continuing rightwardly therefrom to join right end face 92. An integrally-formed bulbous portion 120 extends downwardly from surface 116 adjacent right end face 92 to accommodate the presence of a transverse hole 117. An annular groove 121 extends radially into the post member from surface 112. A plurality of horizontal holes, severally indicated at 122, communicate surfaces 104,106, and may be aligned with holes 88. Thus, a plurality of fasteners, severally indicated at 123, are shown as having their head portions engaging surface 104, and having their threaded shank portions passed through holes 122 and matingly engaging tapped holes 88. In the conventional manner, these fasteners may be selectively tightened to securely mount post member 29 on intermediate slide member 28.

A bearing member 124 is shown as being a specially-configured open-ended tubular member, and is adjustably mounted within post member 29. This bearing member has annular vertical left and right end faces 125, 126, respectively, and an outer surface which sequentially includes (from left-to-right): an externally-threaded portion 128 matingly engaging threads 93, a rightwardly- and outwardly-facing frusto-conical surface 129, an outwardly-facing horizontal cylindrical surface 130, a leftwardly-facing annular vertical surface 131, and an outwardly-facing horizontal cylindrical surface 132 continuing rightwardly therefrom to join right end face 126 and arranged to slidably engage post member inner surface 94. The bearing member inner surface sequentially includes (from left-to-right): an inwardly-facing horizontal cylindrical surface 133 extending rightwardly from left end face 125, a leftwardly-facing annular vertical surface 134, an inwardly-facing horizontal cylindrical surface 135, a leftwardly-facing annular vertical surface 136, and an inwardly-facing horizontal cylindrical 138 continuing rightwardly therefrom to join right end face 126. Thus, bearing member 124 may be selectively rotated relative to post member 29 to vary the axial position of its right end face 126 relative to O-ring 98. As shown in FIGS. 1 and 2, the bearing member right end face 126 urges an annular low-friction sleeve 127 against the outer surface of ball 30 via an intermediate wave spring 137.

Figure 5:
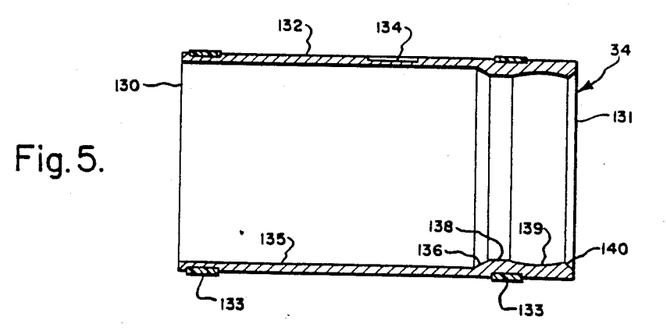
FIG. 5 is a longitudinal vertical sectional view of the male section actuating member shown in FIG. 1.

Referring now to FIG. 5 actuating member 34 is shown as being a horizontally-elongated open-ended tubular member having annular vertical left and right end faces 130,131, respectively, and an outwardly-facing horizontal cylindrical surface 132 extending therebetween. A pair of axially-spaced annular recess extend radially into the actuating member from outer surface 132 to receive and accommodate a pair of ring-like low-friction slide bearings, severally indicated at 133. The cylindrical outer surfaces of these bearings extend radially outwardly beyond surface 132, and slidably engage post member inner surface 86. An axially-extending rectangular slot 134 extends into the actuating member from outer surface 132 to receive and accommodate intermediate part lug 90. This lug-and-slot forms somewhat of a key-keyway connection which restrains relative rotation between the actuating and intermediate members, and which limits permissible relative sliding movement therebetween. The actuating member inner surface sequentially includes (from left-to-right): an inwardly-facing horizontal cylindrical surface 135 extending rightwardly from left end face 130, a leftwardly- and inwardly-facing frusto-conical surface 136, an inwardly-facing horizontal cylindrical surface 138, an inwardly-facing concave spherically-segmented annular surface 139, and a rightwardly-and inwardly-facing frusto conical surface 140 continuing rightwardly therefrom to join right end face 131.

Figure 6:
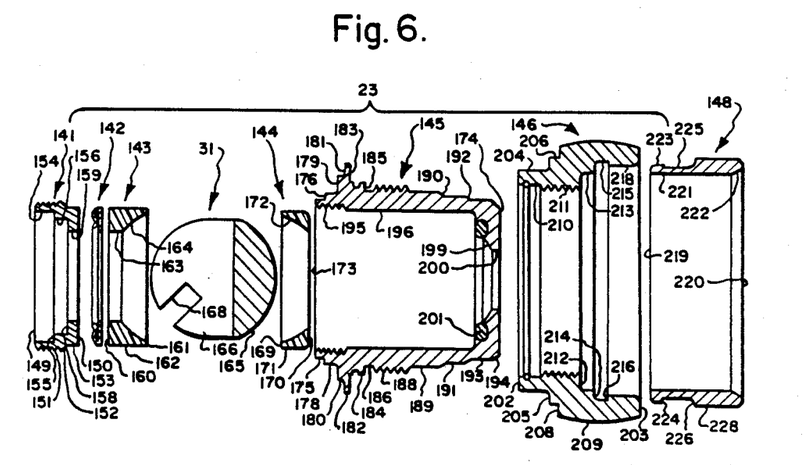
FIG. 6 is an exploded longitudinal vertical sectional view of the male section pivotal docking member shown in FIG. 1.

Referring now to FIG. 6, the male section docking member 23 is shown as being an assembly which broadly includes: an adjustment cap 141, an annular wave spring 142, a left contoured bearing sleeve 143, ball valve 31, right contoured bearing sleeve 144, body 145, pivot member 146, and approach guide 148.

Adjustment cap 141 is shown as being a horizontally-elongated open-ended stepped tubular member having annular vertical left and right end faces 149,150, respectively, and an outer surface which sequentially includes:

an externally-threaded portion 151 extending rightwardly from left end face 149, a rightwardly- and outwardly-facing frusto-conical surface 152, and an outwardly-facing horizontal cylindrical surface 153 continuing rightwardly therefrom to join right end face 150. The inner surface is stepped, and sequentially includes (from left-to-right): an inwardly-facing horizontal cylindrical surface 154 extending rightwardly from left end face 149, a leftwardly-facing annular vertical surface 155, an inwardly-facing horizontal cylindrical surface 156, a leftwardly-facing annular vertical surface 158, and an inwardly-facing horizontal cylindrical surface 159 continuing rightwardly therefrom to join right end face 150..

Left bearing sleeve 143 has annular vertical left and right end faces 160,161, respectively; an outwardly-facing horizontal cylindrical surface 162 extending therebetween; and an inner surface which sequentially includes: an inwardly-facing horizontal cylindrical surface 163 extending rightwardly from left end face 160, and an annular concave spherically-segmented surface 164 continuing rightwardly therefrom to join right end face 161. Surface 164 is arranged to slidably engage the outer surface of ball valve 31.

Ball valve 31 is of the rotating-type, and is more particularly shown in U.S. Pat. Nos. 4,473,211, 4,627,598 and/or 4,664,149, the aggregate disclosures of which are hereby incorporated by reference. This ball has a spherical outer surface 165, and is provided with a U-shaped diametrical flow passageway 166 therethrough. The entire spherical outer surface 165 does not appear in FIG. 6 because this view is taken centrally through the passageway. The ball is also provided with a radially-extending rectangular slot 168, to slidably accommodate the presence of a pivot pin passed through the hole provided at the right end of movable post member 29.

Right bearing member 144 is shown as being a ring-shaped member having annular vertical left and right end faces 169,170, respectively, and an outwardly-facing horizontal cylindrical surface 171 extending therebetween. The inner surface 172 is configured as an annular spherical segment, as is also adapted to slidably engage ball spherical outer surface 165. Bearing sleeves 143,144 are formed of a suitable low-friction material, such as polytetraflouroethylene (e.g., Teflon ®) or the like.

Body 145 is shown as being a horizontally-elongated specially-configured tubular member having an inturned right marginal end portion. More particularly, this body has annular vertical left and right end faces 173, 174, respectively, and an outer surface which sequentially includes (from left-to-right): an outwardly-facing horizontal cylindrical surface 175 extending rightwardly from left end face 173, a leftwardly-facing annular vertical surface 176, an outwardly-facing horizontal cylindrical surface 178, a leftwardly-facing annular vertical surface 179, an outwardly-facing horizontal cylindrical surface 180, a leftwardly-facing annular vertical surface 181, an outwardly-facing horizontal cylindrical surface 182, a rightwardly-facing annular vertical surface 183, an outwardly-facing horizontal cylindrical surface 184, a rightwardly-facing annular vertical surface 185, an outwardly-facing horizontal cylindrical surface 186, an externally-threaded portion 188, an outwardly-facing horizontal cylindrical surface 189, a rightwardly- and outwardly-facing frusto-conical surface 190, an outwardly-facing horizontal cylindrical surface 191, an outwardly-and rightwardly-facing frusto-conical surface 192, and outwardly-facing horizontal cylindrical surface 193, and an outwardly- and rightwardly-facing frusto-conical surface 194 continuing rightwardly therefrom to join right end face 174. The inner surface of body 145 sequentially includes (from left-to-right): an internally-threaded portion 195 extending rightwardly from left end face 173, an inwardly-facing horizontal cylindrical surface 196, a leftwardly-facing annular vertical surface 198, a leftwardly- and inwardly-facing frusto-conical surface 199, and an inwardly-facing horizontal cylindrical surface 200 continuing rightwardly therefrom to join right end face 174. An annular groove or recess extend radially into the body from frusto-conical surface 199 to receive and accommodate an O-ring 201.

Pivot member 146 is shown as being a horizontally-elongated specially-configured open-ended tubular member having annular vertical left and right end faces 202,203, respectively. The outer surface of this member sequentially includes (from left-to-right): an outwardly-facing horizontal cylindrical surface 204, a leftwardly-facing annular vertical surface 205, an outwardly-facing horizontal cylindrical surface 206, a leftwardly-facing annular vertical surface 208, and an outwardly-facing convex spherically-segmented surface 209 continuing rightwardly therefrom to join right end face 203. The inner surface of member 206 sequentially includes (from left-to-right): an inwardly-facing horizontal cylindrical surface 210 extending rightwardly from left end face 202, an internally-threaded portion 211, a rightwardly-facing annular vertical surface 212, an inwardly-facing horizontal cylindrical surface 213, a rightwardly-facing annular vertical surface 214, an inwardly-facing horizontal cylindrical surface 215, a leftwardly-facing annular vertical surface 216, and an inwardly-facing horizontal cylindrical surface 218 continuing rightwardly therefrom to join right end face 203. Pivot member 146 is arranged to be operatively positioned within the actuating member such that complementarily-configured spherically-segmented surfaces 209,139 slidably engage one another. Hence, the male section docking member 23 is mounted for omni-directional pivotal movement relative to actuating member 34.

Approach guide 148 is shown as being a horizontal-elongated open-ended tubular member having annular vertical left and right end faces 219,220, respectively, and as having an inner surface which sequentially includes: an inwardly-facing horizontal cylindrical surface 221 extending rightwardly from left end face 219, and a rightwardly- and inwardly-facing frusto-conical surface 222 continuing rightwardly therefrom to join right end face 220. The outer surface of guide 148 sequentially includes (from left-to-right): an outwardly-facing horizontal cylindrical surface 223, a rightwardly-facing annular vertical surface 224, an outwardly-facing horizontal cylindrical surface 225, a leftwardly-facing annular vertical surface 226, and an outwardly-facing horizontal cylindrical surface 228 continuing rightwardly therefrom to join right end face 220. Thus, the outer surface of approach member 148 is configured to have an integrally-formed hook member at its left end, which is adapted to be snapped into the pivot member annular recess defined by surfaces 214, 215, 216.

Figure 7:
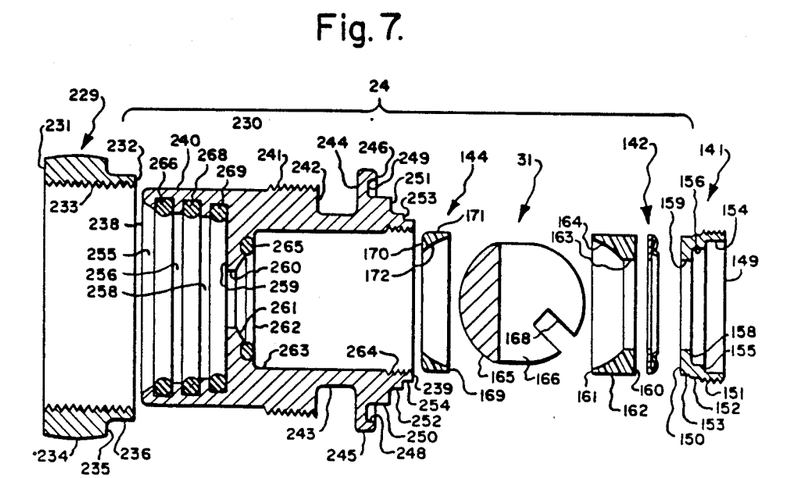
FIG. 7 is an exploded longitudinal vertical sectional view of the female section pivotal docking member shown in FIG. 2.

Referring now to FIG. 7, the female section docking member 24 is shown as broadly including (from left-to-right): a pivot member 229, a body 230, a bearing sleeve 144, ball valve element 31, bearing sleeve 143, wave spring 142, and adjustment cap 141. Since ball 31 and elements 141-144 have been previously described, a further description thereof will be omitted, except to say that these various elements appear as mirror images of the corresponding elements depicted in FIG. 6.

Pivot member 229 is shown as being a horizontally-elongated specially-configured member having annular vertical left and right end faces 231, 232, respectively, and an inner surface defined by internally-threaded portion 233 extending therebetween. The outer surface of this member sequentially includes (from left-to-right): an outwardly-facing convex spherically-segmented surface 234 adapted to slidably engage female secton actuating member inner surface 139, a rightwardly-facing annular vertical surface 235, and an outwardly-facing horizontal cylindrical surface 236 continuing rightwardly therefrom to join right end face 232.

Female docking section body 230 is shown as being a horizontally-elongated specially-configured stepped tubular member having annular vertical left and right end faces 238, 239, respectively. The outer surface of body 230 sequentially includes (from left-to-right): an outwardly-facing horizontal cylindrical surface 240 extending rightwardly from left end face 238, an externally-threaded portion 241, a rightwardly-facing annular vertical surface 242, an outwardly-facing horizontal cylindrical surface 243, a leftwardly-facing annular vertical surface 244, an outwardly-facing horizontal cylindrical surface 245, a rightwardly-facing annular vertical surface 246, an inwardly-facing horizontal cylindrical surface 248 extending leftwardly therefrom, a rightwardly-facing annular vertical surface 249, an outwardly-facing horizontal cylindrical surface 250, a rightwardly-facing annular vertical surface 251, an outwardly-facing horizontal cylindrical surface 252, a rightwardly-facing annular vertical surface 253, and an outwardly-facing horizontal cylindrical surface 254 continuing rightwardly therefrom to join right end face 239. The inner surface of body 230 sequentially includes (from left-to-right): a leftwardly- and inwardly-facing frusto-conical surface 255 extending rightwardly from left end face 238, two axially-spaced inwardly-facing horizontal cylindrical surfaces 256, 258, a leftwardly-facing annular vertical surface 259, an inwardly-facing horizontal cylindrical surface 260, a rightwardly- and inwardly-facing spherically-segmented concave surface 261, a rightwardly-facing annular vertical surface 262, an inwardly-facing horizontal cylindrical surface 263, and an internally-threaded portion 264 continuing rightwardly therefrom to join right end face 239. An annular groove is shown as extending radially into the body from frusto-conical surface 261 to receive and accomodate an O-ring 265. Three axially-spaced annular grooves are shown as extending into the body member between surfaces 255, 256, 256, 258 and 258, 259, respectively, to receive and accomodate three O-rings 266, 268 and 269, respectively. These three O-rings extend progressively radially inwardly from left-to-right. In other words, O-ring 269 is arranged to be radially inwardly of O-ring 268, which extends radially inwardly of O-ring 266. O-rings 266, 268, 269 are adapted to sealingly engage male docking member body surfaces 189, 191, 193, respectively, when the two coupling sections are joined together.

The first bellows 32 surrounds stationary post member 26 and has its left marginal end portion 270 snapped into sealing engagement with flange portion of the stationary post member, and has its right marginal end portion 271 snapped into sealing engagement with the flange portion of the movable post member. The second bellows 33 surrounds the movable post member 29 and has its left marginal end portion 272 sealing by engaging the flange portion of the movable post member, and has its right marginal end portion 273 sealingly engaging the associated docking member. Each of these bellows functions to sealingly connect the associated structure to which its ends are sealingly secured. Moreover, each bellows has an integral spring function and biases the actuating member toward its extended position, as shown in FIG. 1. Thus, first bellows 32 urges the intermediate and movable post members to move away from the body and stationary post member, and the second bellows urges the actuating member and the associated docking member to move away from the intermediate and movable post members. If desired, a compressd coil spring 274 may be arranged-within the first bellows to act between surface 66 and the lefwardly-facing surface of the bellows right marginal end portion, to supplement the bias exerted by bellows 32. This spring 274 is shown as being present in the male section, but absent in the female section. In the preferred embodiment, first bellows 32 exerts a greater force on the movable post member, than second bellows 33 exerts on the actuating member. This differential force insures that the actuating member will move first from its extended position to its retracted position relative to the intermediate member, before the now-retracted actuating and intermediate members move together toward their retracted positions relative to the body. Otherwise, sequential rotation of the in-board and out-board valve elements would not necessarily occur. While presently preferred because of the integral spring and sealing functions, these bellows are not invariably required. If desired, such functions could be provided by separate elements. For example, the coil springs or the like could be used to exert the differential force on the movable elements, and other types of seals (e.g., sliding seals, diaphragms, etc.) could be employed to perform the sealing function. Thus, the scope of the appended claims should not be regarded as being limited to the rise of the bellows, unless an express limitation to that effect appears therein.

Docking Sequence

The initial docking sequence when the male and female coupling sections are brought together, is illustrated in FIGS. 8-13.

Figure 8:
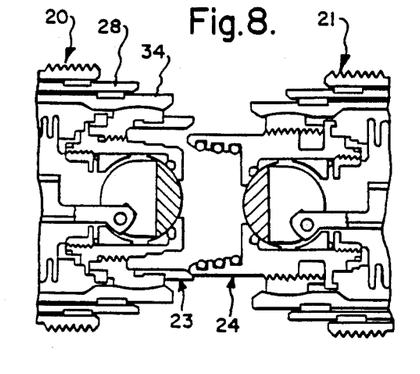
FIG. 8 is a fragmentary longitudinal vertical sectional view showing the misaligned male and female docking members as having just contacted one another at the beginning of the connection sequence.

In FIG. 8, the male and female coupling sections are shown as having been initially positioned relative to one another prior to connection. The flow passageway through female section 21 is shown as being vertically and angularly misaligned with respect to the flow passageway through male section 20. Note that the intermediate part of each section is in its extended position relative to the associated body, that the actuating member of each section is in its extended postion relative to the associated intermediate member and body, and that the in-board balls are in their flow-preventing positions. Thus, FIG. 8 simply shows the misaligned coupling sections as having been initially brought into physical contact with one another such that female section frusto-conical surface 255 just engages male section frusto-conical surface 222 at one point.

Figure 9:
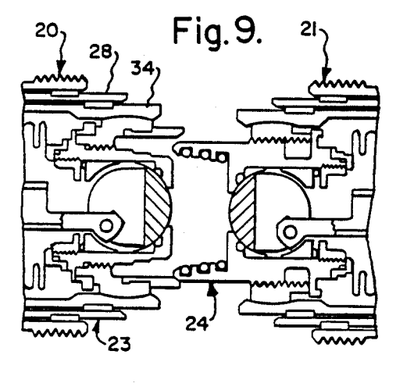
FIG. 9 is a view similar to FIG. 8, but showing the two sections as having been moved further toward one another in an axial direction such that the two docking members have begun to pivot into facing engagement.

FIG. 9 is a view similar to FIG. 8, but shows the two coupling sections as having moved slightly further toward one another. Note that the point of contact between surfaces 255, 222 is slightly different, and that the two docking members have begun to pivot relative to their associated bodies.

Figure 10:
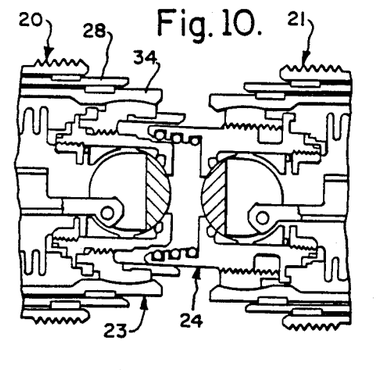
FIG. 10 is a view similar to FIG. 9, and shows the two sections as having moved further toward one another to establish a coarse facing engagement of the docking members.

FIG. 10 is a view similar to FIG. 9, but shows the two coupling sections as having been further moved horizontally toward one another. Note that the right marginal end portion of the male docking member 23 is now clearly inserted into the female section docking member, and that the two coupling sections have rotated relative to their respective bodies so as to provide a coarse facing engagement between the male and female docking members.

Figure 11:
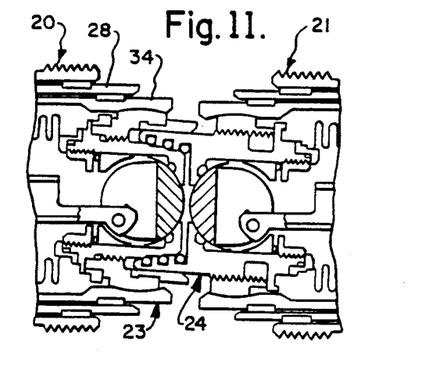
FIG. 11 is a view similar to FIG. 10, but showing the two sections as having moved further toward one another such that the interface seals of the female docking member make contact with the mating surfaces of the male docking member.

FIG. 11 is a view generally similar to FIG. 10, but shows the male docking member as having been inserted further into the female docking member. Note that the respective docking members have pivoted such that female section O-ring 266, 268, 269 have just engaged male section surfaces 189, 191, 193, respectively. It should also be noted that male docking member surface 174 is now arranged in parallel facing relation to female docking member surface 259.

Figure 12:
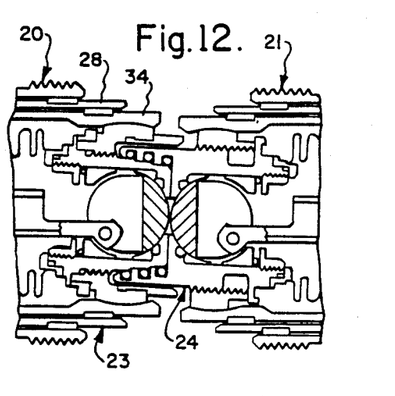
FIG. 12 is a view similar to FIG. 11, and shows the two sections as having moved further toward one another such that the facing surfaces of two docking members abuttingly engage one another.

FIG. 12 is a view generally similar to FIG. 11, but shows the two coupling sections as having been moved further toward one another such that female docking member surface 174 abuttingly engages male docking member surface 259. In FIGS. 8-12, the intermediate and actuating members of the respective coupling sections are shown as being in their fully-extended positions, with the in-board balls remaining in their flow-preventing positions.

Figure 13:
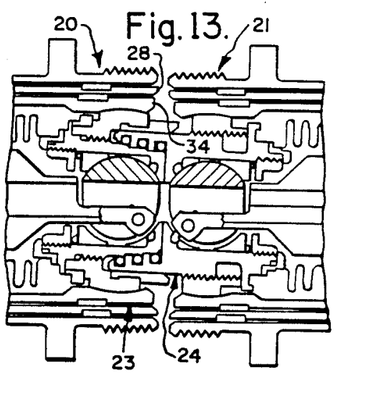
FIG. 13 is a view similar to FIG. 12, but shows the two coupling sections as having been moved still further toward one another such that the actuating member of each section has been axially displaced from its one extreme position ot its other extreme position, with the in-board valve elements shown as having been rotated to their flow-permitting positions.

FIG. 13 is a view generally similar to FIG. 12, but shows the intermediate and actuating members of each coupling section as having moved from their extended to their retracted positions, with the in-board ball valve elements having been rotated to their flow-permitting positions. This figure also illustrates the two coupling sections as being vertically misaligned, with such alignment being accomodated by the abutting pivotal docking members. When the two joined coupling sections are thereafter held together, such as by a quick-disconnect mechanism (not shown), there may be additional forces exerted on the sections which bias them into horizontal alignment.

Ball-Rotation Sequence

The ball-rotation sequence is illustrated in FIGS. 14-17.

FIG. 14 shows the male and female coupling sections as having been initially brought together, prior to connection. In this position, the four ball elements are shown as being in their respective flow-preventing positions. FIG. 14 also shows the two docking members as being in the initial position illustrated in FIG. 8.

Figure 15:
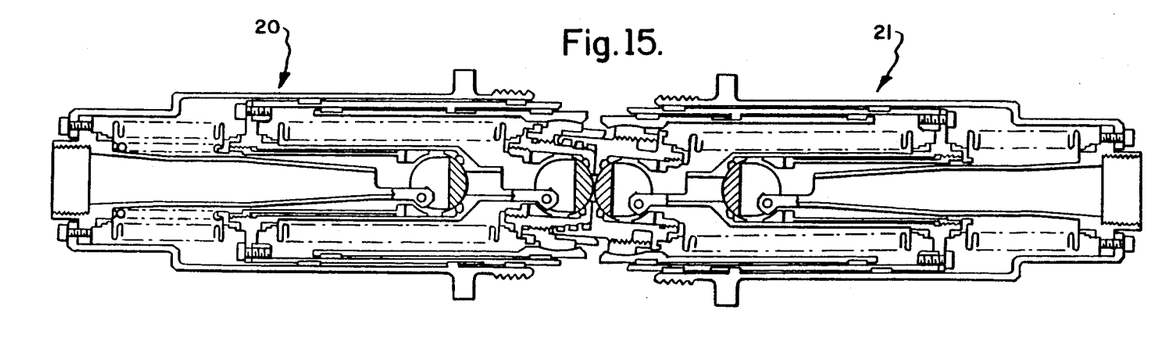
FIG. 15 is a view similar to FIG. 14, but shows the two coupling sections as having been moved relatively toward one another such that the facing surfaces of the respective docking members abuttingly engage one another.

FIG. 15 is a view similar to FIG. 14, but shows the two coupling sections as having been moved relatively toward one another such that the docking member facing surfaces 174, 259 abuttingly engage one another. Note that the intermediate and actuating members of each coupling section are still in their extended positions. Note also that female section O-rings 266, 268, 269 have engaged male docking member surfaces 189, 191, 193 to seal the interface joint between the two docking members prior to rotation of the ball valve elements.

Figure 16:
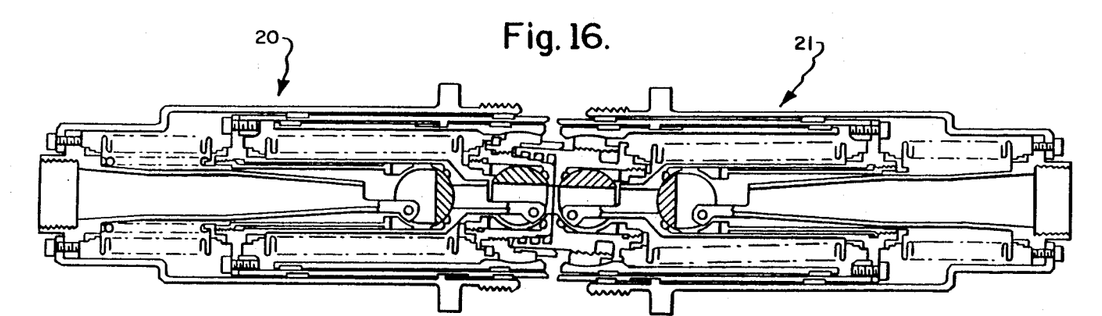
FIG. 16 is a view similar to FIG. 15, but shows each actuating member as having been moved from a first relative position to a second relative position such that the in-board valve elements have been rotated to their flow-permitting postions, while the out-board valve elemnts remain in their flow-preventing positions.

FIG. 16 is a view generally similar to FIG. 15, but shows the two coupling sections as having been moved further relatively toward one another. In this view, the actuating member of each coupling section is shown as having moved from its extended position relative to the surrounding intermediate member, to its retracted position. Such movement of the actuating member relative to the intermediate member causes the in-board ball valve elements to rotate from their flow-preventing positions (as shown in FIG. 15), to their flow-permitting positions, as shown in FIG. 16. Note that the two out-board valve elements remain in their flow-preventing positions.

FIG. 17 is a view generally similar to FIG. 16, but shows the intermediate members as having moved relative to their associated bodies. When this occurs, the out-board ball valve elements rotate toward their flow-permitting positions, thereby to complete the connected passageway through the coupling device.

When the two coupling sections are physically separated from one another, the ball-rotation sequence is the reverse of that just described. More particularly, when the connected sections are initially moved apart, the out-board ball valve elements first rotate from their flow-permitting positions to their flow-preventing positions. As the coupling sections move further apart, the in-board ball valve elements then rotate from their flow-preventing positions to their flow-preventing positions, after which the two coupling sections may be physically separated from one another.

Thus, in the preferred embodiment, the valve elements of each coupling section rotates sequentially between their flow-preventing and flow-permitting positions. The two valve elements of each section are provided in series in the flow passage therethrough, and thus provide a dual-redundant seal in each separated coupling section. Hence, even if one ball valve were to remain in its flow-permitting position, or in some position other than in its fully-closed flow-preventing position, the other ball would close the flow passage-way through the separated section.

Modifications

The present invention contemplates that various changes and modifications may be made. For example, the first and second bellows may bias the intermediate and actuating membes towards their extended positions. Alternatively, physically-separate springs or the like or other resilent members may be used to provide this biasing action. Filters and the like may be provided in the flow passageway, as desired. While the preferred embodiment is shown as having duel redundant valve elements, three or more valve elements might alternatively be provided.

The physical structure of the various parts and components may be readily changed as desired. For example, a slot-and-recess connection is shown as being provided between the intermediate member, and between the intermediate and actuating members. However, this is somewhat schematic, and is simply used to illustrate the principles of the invention. Obviously, other types of devices for limiting or restraining relative axial movement between these members, and/or for preventing relative rotation therebetween, might alternatively be employed. In the preferred embodiment, the actuating mechanism sequentially rotates the in-board and out-board balls of each section between their flow-permitting and flow-preventing positions. However, this sequential operation may be readily changed to simultaneous operation, as desired.

Therefore, while the presently-preferred embodiment of the improved coupling device has been shown and described, and several modifications thereof discussed, persons skilled in this art will appreciate that various additional changes and modifications may be made without departing from the spirit of the invention, as defined and differentiated by the followed claims.

We claim:

1. In a coupling section having an elongated body provided with a flow passageway therethrough, and having actuating member mounted for movement relative to said body between two extreme positions, the improvement which comprises:

at least two valve elements operatively arranged in said passageway, each of said elements being mounted for rotation between a flow-preventing position and a flow-permitting position, each of said elements being in said flow-preventing position when said actuating member is in one of said extreme positions and being in said flow-permitting position when said actuating member is in the other of said extreme positions; and an actuating mechanism for selectively rotating said valve elements sequentially between their flow-preventing positions and their flow-permitting positions when said actuating member is moved from said one extreme position to said other extreme position;

whereby, when said actuating member is in said one extreme position, said valve elements will redundantly close said flow passageway.

2. The improvement as set forth in claim 1 wherein each of said valve elements is in its flow-preventing position when said actuating member is in a first position relative to said body, wherein one of said valve elements is in its flow-preventing position and the other of said valve elements is in its flow-permitting position when said actuating member is in a second position relative to said body, and wherein each of said valve element is in its flow-permitting position when said actuating member is in a third position relative to said body.

3. The improvement as set forth in claim 1 wherein said actuating member is biased toward said one extreme position.

4. The improvement as set forth in claim 1 wherein said actuating member is telescopingly received in said body.

5. The improvement as set forth in claim 1 and further comprising:

a docking member mounted on said actuating member for omni-directional pivotal movement relative thereto to accomodate an initial misalignment of said coupling section with another section to which it is to be connected.

6. The improvement as set forth in claim 5 wherein said docking member continuously engages one of said valve elements, wherein said valve element has a central axis, and wherein the pivotal axis of said docking member is coincident with said one valve element central axis.

7. The improvement as set forth in claim 1, and further comprising:

a first post member mounted fast to said body; and a second post member mounted for movement relative to said body;

and wherein one of said valve elements is eccentrically connected to first post member and a second of said valve elements is eccentrically connected to said second post member, and wherein said actuating member engages said second valve element and is mounted for movement relative to said second post member.

8. The improvement as set forth in claim 7 wherein said second post member and said actuating member are telescopingly received in said body.

9. The improvement as set forth in claim 8 and further comprising:

stop means operatively arranged to prevent movement of said actuating member beyond either extreme position.

10. The improvement as set forth in claim 8 wherein said stop means is operatively arranged to limit axial movement of said second post member relative to said body.

11. The improvement as set forth in claim 7 and further comprsing:

a first flexible seal surrounding said flow passageway and operatively engaging said body and said second post member, and a second flexible seal surrounding said flow passageway and operatively engaging said second post member and said actuating member.

12. The improvement as set forth in claim 11 wherein said first and second seals are operatively arranged to urge said actuating member toward said one extreme position.

13. The improvement as set forth in claim 11 wherein said first seal is a bellows.

14. The improvement as set forth in claim 11 wherein said second seal is a bellows.

15. In a coupling section having an elongated body provided with a flow passageway therethrough, and having actuating member mounted for movement relative to said body between two extreme positions, the improvement which comprises:

biasing means for urging said actuating member to move toward one of said extreme positions;

at least two valve elements operatively arranged in said passageway, each of said elements being mounted for rotation between a flow-preventing position and a flow-permitting position, each of said elements being in said flow-preventing position when said actuating member is in said one extreme position and being in said flow-permitting position when said actuating member is in the other of said extreme positions; and an actuating mechanism for selectively rotating said valve elements from their flow-preventing positions to their flow-permitting positions when said actuating member is moved from said one extreme position to said other extreme position;

whereby, when said actuating member is in said one extreme position, said valve elements will redundantly close said flow passageway.

16. In a coupling section having an elongated body provided with a flow passageway therethrough, and having actuating member mounted for movement relative to said body between two extreme positions, the improvement which comprises:

at least two valve elements operatively arranged in said passageway, each of said elements being mounted for rotation between a flow-preventing position and a flow-permitting position, each of said elements being in said flow-preventing position when said actuating member is in one of said extreme positions and being in said flow-permitting position when said actuating member is in the other of said extreme positions; and an actuating mechanism for selectively rotating said valve elements from their flow-preventing positions to their flow-permitting positions when said actuating member is moved from said one extreme position to said other extreme position;

a docking member mounted on said actuating member for omni-directional pivotal movement relative thereto to accomodate an initial misalignment of said coupling section with another section to which it is to be connected;

whereby, when said actuating member is in said one extreme position, said valve elements will redundantly close said flow passageway.

17. In a coupling section having an elongated body provided with a flow passageway therethrough, and having actuating member mounted for movement relative to said body between two extreme positions, the improvement which comprises:

at least two valve elements operatively arranged in said passageway, each of said elements being mounted for rotation between a flow-preventing position and a flow-permitting position, each of said elements being in said flow-preventing position when said actuating member is in one of said extreme positions and being in said flow-permitting position when said actuating member is in the other of said extreme positions; and an actuating mechanism for selectively rotating said valve elements from their flow-preventing positions to their flow-permitting positions when said actuating member is moved from said one extreme position to said other extreme position, said actuating mechanism including a first post member mounted fast to said body, a second post member mounted for movement relative to said body, and wherein a first of said valve elements is eccentrically mounted on said first post member and a second of said valve elements is eccentrically mounted on said second past member, and wherein said actuating member engages said second valve element and is mounted for movement relative to said second post member;

whereby, when said actuating member is in said one extreme position, said valve elements will redundantly close said flow passageway.

* * * * *